United States Patent
Furht et al.

(10) Patent No.: US 11,812,054 B2
(45) Date of Patent: Nov. 7, 2023

(54) SIGNALING OF GLOBAL MOTION VECTOR IN PICTURE HEADER

(71) Applicant: OP Solutions, LLC, Amherst, MA (US)

(72) Inventors: Borivoje Furht, Boca Raton, FL (US); Hari Kalva, Boca Raton, FL (US); Velibor Adzic, Canton, GA (US)

(73) Assignee: OP Solutions, LLC, Amherst, MA (US)

( * ) Notice: Subject to any disclaimer, the term of this patent is extended or adjusted under 35 U.S.C. 154(b) by 0 days.

(21) Appl. No.: 17/672,420

(22) Filed: Feb. 15, 2022

(65) Prior Publication Data

US 2022/0174312 A1 Jun. 2, 2022

Related U.S. Application Data

(63) Continuation of application No. 17/006,521, filed on Aug. 28, 2020, now Pat. No. 11,252,433, which is a continuation of application No. PCT/US2020/029944, filed on Apr. 24, 2020.

(60) Provisional application No. 62/838,509, filed on Apr. 25, 2019.

(51) Int. Cl.
| | |
|---|---|
| *H04N 19/527* | (2014.01) |
| *H04N 19/124* | (2014.01) |
| *H04N 19/172* | (2014.01) |
| *H04N 19/176* | (2014.01) |
| *H04N 19/184* | (2014.01) |
| *H04N 19/44* | (2014.01) |
| *H04N 19/91* | (2014.01) |
| *H04N 19/96* | (2014.01) |

(52) U.S. Cl.
CPC ......... *H04N 19/527* (2014.11); *H04N 19/124* (2014.11); *H04N 19/172* (2014.11); *H04N 19/176* (2014.11); *H04N 19/184* (2014.11); *H04N 19/44* (2014.11); *H04N 19/91* (2014.11); *H04N 19/96* (2014.11)

(58) Field of Classification Search
None
See application file for complete search history.

(56) References Cited

U.S. PATENT DOCUMENTS

| | | | | |
|---|---|---|---|---|
| 9,456,214 | B2 * | 9/2016 | Sugio | H04N 19/172 |
| 10,462,462 | B2 * | 10/2019 | Chien | H04N 19/52 |
| 10,560,712 | B2 * | 2/2020 | Zou | H04N 19/18 |
| 10,631,002 | B2 * | 4/2020 | Li | H04N 19/147 |
| 10,659,802 | B2 * | 5/2020 | Lainema | H04N 19/70 |

(Continued)

FOREIGN PATENT DOCUMENTS

| | | |
|---|---|---|
| WO | 2017087751 A1 | 5/2017 |
| WO | 2019075058 A1 | 11/2017 |

OTHER PUBLICATIONS

Office Action in Japanese Application 2021-563017 (English translation).
Extended European Search Report in EP Application 20 79 5854.

*Primary Examiner* — Reza Aghevli
(74) *Attorney, Agent, or Firm* — OP Solutions IP Department; Paul Ackerman

(57) ABSTRACT

A decoder includes circuitry configured to receive a bitstream, extract a header, determine, using the header, a global motion model, and decode a current block of a current frame using the global motion model. Related apparatus, systems, techniques and articles are also described.

12 Claims, 7 Drawing Sheets

(56) References Cited

U.S. PATENT DOCUMENTS

| | | | |
|---|---|---|---|
| 10,681,374 B2* | 6/2020 | Mukherjee | H04N 19/192 |
| 10,701,390 B2* | 6/2020 | Li | H04N 19/176 |
| 10,778,999 B2* | 9/2020 | Li | H04N 19/70 |
| 10,805,630 B2* | 10/2020 | Li | H04N 19/176 |
| 11,252,433 B2* | 2/2022 | Furht | H04N 19/527 |
| 2005/0069039 A1* | 3/2005 | Crinon | H04N 19/51 |
| | | | 375/E7.199 |
| 2015/0181232 A1 | 6/2015 | Takahashi et al. | |
| 2017/0332095 A1* | 11/2017 | Zou | H04N 19/537 |
| 2018/0091816 A1* | 3/2018 | Chien | H04N 19/91 |
| 2018/0098062 A1* | 4/2018 | Li | H04N 19/70 |
| 2018/0098087 A1* | 4/2018 | Li | H04N 19/132 |
| 2018/0270500 A1* | 9/2018 | Li | H04N 19/52 |
| 2018/0316929 A1* | 11/2018 | Li | H04N 19/52 |
| 2018/0359483 A1 | 12/2018 | Chen et al. | |
| 2019/0104319 A1* | 4/2019 | Zhang | H04N 19/54 |
| 2019/0110064 A1* | 4/2019 | Zhang | H04N 19/54 |
| 2019/0116376 A1* | 4/2019 | Chen | H04N 19/70 |
| 2019/0149838 A1* | 5/2019 | Zhang | H04N 19/105 |
| | | | 375/240.16 |
| 2019/0149841 A1* | 5/2019 | Mukherjee | H04N 19/147 |
| | | | 375/240.16 |
| 2019/0215534 A1* | 7/2019 | Kondo | H04N 19/61 |
| 2019/0222865 A1* | 7/2019 | Zhang | H04N 19/615 |
| 2019/0364298 A1 | 11/2019 | Kang et al. | |
| 2019/0387249 A1* | 12/2019 | Huang | H04N 19/51 |
| 2020/0021839 A1* | 1/2020 | Pham Van | H04N 19/521 |
| 2020/0029091 A1* | 1/2020 | Chien | H04N 19/139 |
| 2020/0077113 A1* | 3/2020 | Huang | H04N 19/55 |
| 2020/0099951 A1* | 3/2020 | Hung | H04N 19/55 |
| 2020/0112725 A1* | 4/2020 | Huang | H04N 19/139 |
| 2020/0145688 A1* | 5/2020 | Zou | H04N 19/567 |
| 2020/0213585 A1* | 7/2020 | Huang | G06F 1/03 |
| 2020/0260106 A1* | 8/2020 | Huang | H04N 19/52 |
| 2020/0260111 A1* | 8/2020 | Liu | H04N 19/527 |
| 2020/0288156 A1* | 9/2020 | Huang | H04N 19/63 |
| 2020/0304828 A1* | 9/2020 | Huang | H04N 19/42 |
| 2021/0203975 A1* | 7/2021 | Chen | H04N 19/46 |
| 2021/0235073 A1* | 7/2021 | Liu | H04N 19/176 |
| 2021/0235105 A1* | 7/2021 | Chen | H04N 19/513 |
| 2021/0266531 A1* | 8/2021 | Kang | H04N 19/184 |
| 2021/0274212 A1* | 9/2021 | Liu | H04N 19/52 |
| 2021/0281876 A1* | 9/2021 | Zhang | H04N 19/157 |

* cited by examiner

| MotionModelIdc[ x ][ y ] | Motion model for motion compensation |
|---|---|
| 0 | Translational motion |
| 1 | 4-parameter affine motion |
| 2 | 6-parameter affine motion |

SIGNALING OF GLOBAL MOTION VECTOR IN PICTURE HEADER

CROSS-REFERENCE TO RELATED APPLICATIONS

This application is a continuation of U.S. Nonprovisional application Ser. No. 17/006,521, filed on Aug. 28, 2020 and entitled "SIGNALING OF GLOBAL MOTION VECTOR IN PICTURE HEADER," which claims the benefit of priority of International Application No. PCT/US20/29944, filed on Apr. 24, 2020 and entitled "SIGNALING OF GLOBAL MOTION VECTOR IN PICTURE HEADER," which claims the benefit of priority of U.S. Provisional Patent Application Ser. No. 62/838,509, filed on Apr. 25, 2019, and titled "SIGNALING OF GLOBAL MOTION VECTOR IN PICTURE HEADER." Each of U.S. application Ser. No. 17/006,521, International Application No. PCT/US20/29944, and U.S. Provisional Patent Application Ser. No. 62/838,509 is incorporated by reference herein in its entirety.

FIELD OF THE INVENTION

The present invention generally relates to the field of video compression. In particular, the present invention is directed to signaling of global motion vector in picture header.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

SUMMARY OF THE DISCLOSURE

In an aspect, a decoder includes circuitry configured to receive a bitstream, extract a header, determine, using the header, a global motion model, and decode a current block of a current frame using the global motion model.

In another aspect, a method includes receiving, by a decoder, a bitstream. The method includes extracting a header from the bitstream. The method includes determining, using the header, a global motion model. The method includes decoding a current block of a current frame using the global motion model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2 illustrates three example motion models that can be utilized for global motion including their index value (0, 1, or 2);

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

"Global motion" in video refers to motion and/or a motion model common to all pixels of a region, where a region may be a picture, a frame, or any portion of a picture or frame such as a block, CTU, or other subset of contiguous pixels. Global motion may be caused by camera motion, such as without limitation, camera panning and zooming creates motion in a frame that can typically affect the entire frame. Motion present in portions of a video may be referred to as local motion. Local motion may be caused by moving objects in a scene; for instance and without limitation, local motion may be caused by an object moving from left to right in the scene. Videos may contain a combination of local and global motion. Some implementations of current subject matter may provide for efficient approaches to communicate global motion to a decoder and use of global motion vectors in improving compression efficiency.

Figure 1:
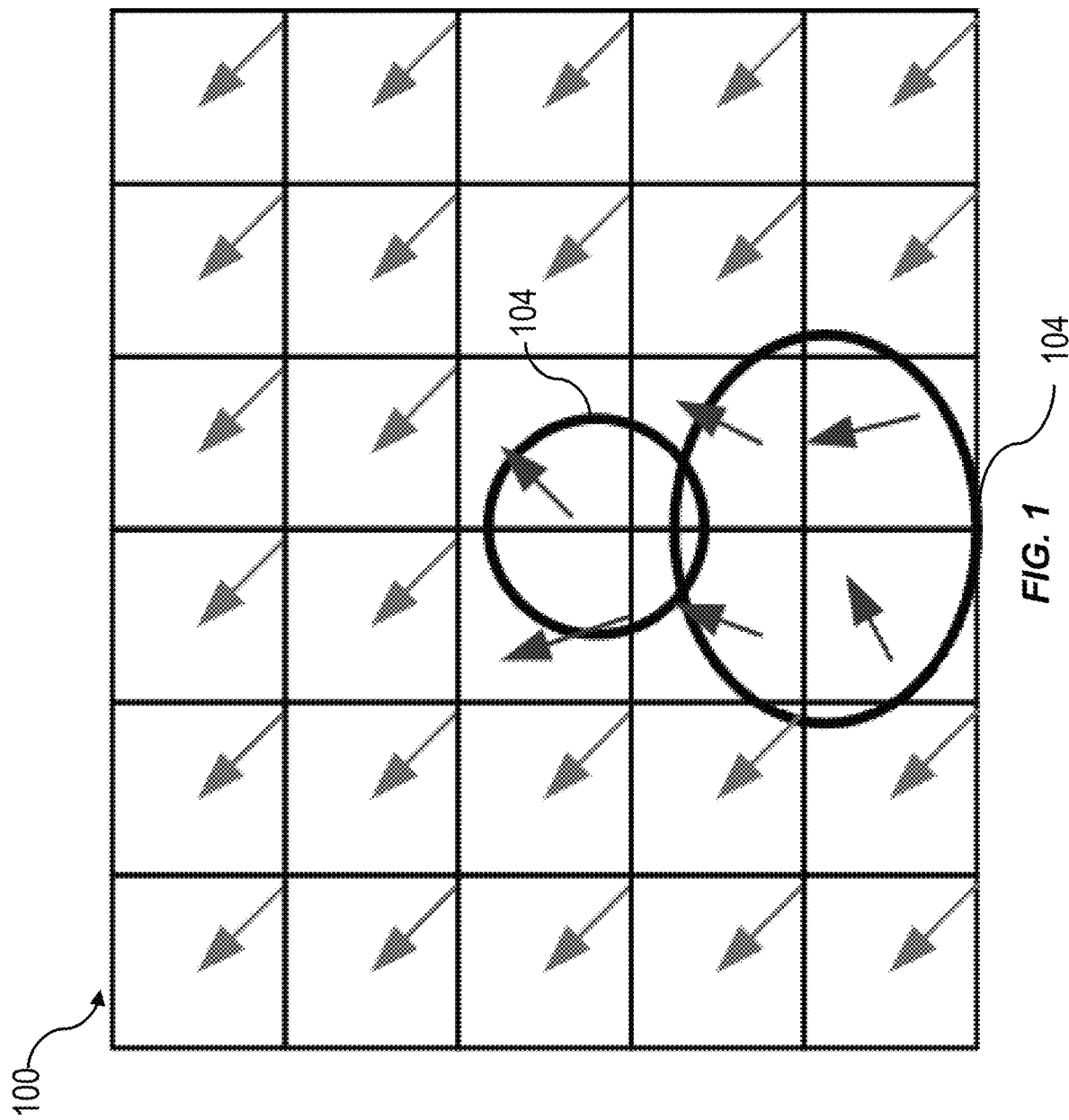
FIG. 1 is a diagram illustrating motion vectors of an example frame with global and local motion.

FIG. 1 is a diagram illustrating an exemplary embodiment of motion vectors of an example frame 100 with global and local motion. Frame 100 may include a number of blocks of pixels illustrated as squares, and their associated motion vectors illustrated as arrows. Squares (e.g., blocks of pixels) with arrows pointing up and to the left indicate blocks with motion that may be considered to be global motion and squares with arrows pointing in other directions (indicated by 104) indicate blocks with local motion. In the illustrated example of FIG. 1, many of the blocks have same global motion. Signaling global motion in a header, such as a picture parameter set (PPS) or sequence parameter set (SPS) and using signal global motion may reduce motion vector information needed by blocks and can result in improved prediction. Although for illustrative purposes examples described below refer to determination and/or application of global or local motion vectors at a block level, global motion vectors may be determined and/or applied for any region of a frame and/or picture, including regions made up of multiple blocks, regions bounded by any geometric form such as without limitation regions defined by geometric and/or exponential coding in which one or more lines and/or curves bounding the shape may be angled and/or curved, and/or an entirety of a frame and/or picture. Although signaling is described herein as being performed at a frame level and/or in a header and/or parameter set of a frame, signaling may alternatively or additionally be performed at a sub-picture level, where a sub-picture may include any region of a frame and/or picture as described above.

As an example, and continuing to refer to FIG. 1, simple translational motion may be described using a motion vector (MV) with two components $MV_x$, $MV_y$ that describes displacement of blocks and/or pixels in a current frame. More complex motion such as rotation, zooming, and warping may be described using affine motion vectors, where an "affine motion vector," as used in this disclosure, is a vector describing a uniform displacement of a set of pixels or points represented in a video picture and/or picture, such as a set of pixels illustrating an object moving across a view in a video without changing apparent shape during motion. Some approaches to video encoding and/or decoding may use 4-parameter or 6-parameter affine models for motion compensation in inter picture coding.

For example, and still referring to FIG. 1, a six-parameter affine motion model may describe affine motion as:

$$x'=ax+by+c$$

$$y'=dx+ey+f$$

A four-parameter affine motion can be described as:

$$x'=ax+by+c$$

$$y'=-bx+ay+f$$

where (x,y) and (x',y') are pixel locations in current and reference pictures, respectively; a, b, c, d, e, and f may represent parameters of the affine motion model.

With continued reference to FIG. 1, parameters used describe affine motion are signaled to the decoder to apply affine motion compensation at the decoder. In some approaches, motion parameters may be signaled explicitly or by signaling translational control point motion vectors (CPMVs) and then deriving affine motion parameters from the translational motion vectors. Two control point motion vectors (CPMVs) may be utilized to derive affine motion parameters for a four-parameter affine motion model and three control point translational motion vectors (CPMVs) may be utilized to obtain parameters for a six-parameter motion model. Signaling affine motion parameters using control point motion vectors may allow use of efficient motion vector coding methods to signal affine motion parameters.

In some implementations, and further referring to FIG. 1, global motion signaling may be included in a header, such as the PPS or SPS. Global motion may vary from picture to picture. Motion vectors signaled in picture headers may describe motion relative to previously decoded frames. In some implementations, global motion may be translational or affine. A motion model (e.g., number of parameters, whether the model is affine, translational, or other) used may also be signaled in a picture header.

Referring now to FIG. 2, three non-limiting exemplary embodiments of motion models 200 that may be utilized for global motion including their index value (0, 1, or 2) are illustrated.

Still referring to FIG. 2, a PPS may be used to signal parameters that change between pictures of a sequence. Parameters that remain the same for a sequence of pictures may be signaled in a sequence parameter set to reduce the size of PPS and reduce video bitrate. An example picture parameter set (PPS) is shown in table 1:

| pic_parameter_set_rbsp( ) { | Descriptor |
|---|---|
| pps_pic_parameter_set_id | ue(v) |
| pps_seq_parameter_set_id | u(4) |
| mixed_nalu_types_in_pic_flag | u(1) |
| pic_width_in_luma_samples | ue(v) |
| pic_height_in_luma_samples | ue(v) |
| pps_conformance_window_flag | u(1) |
| if( pps_conformance_window_flag ) { | |
|   pps_conf_win_left_offset | ue(v) |
|   pps_conf_win_right_offset | ue(v) |
|   pps_conf_win_top_offset | ue(v) |
|   pps_conf_win_bottom_offset | ue(v) |
| } | |
| scaling_window_explicit_signalling_flag | u(1) |
| if( scaling_window_explicit_signalling_flag ) { | |
|   scaling_win_left_offset | ue(v) |
|   scaling_win_right_offset | ue(v) |
|   scaling_win_top_offset | ue(v) |
|   scaling_win_bottom_offset | ue(v) |
| } | |
| output_flag_present_flag | u(1) |
| subpic_id_mapping_in_pps_flag | u(1) |
| if( subpic_id_mapping_in_pps_flag ) { | |
|   pps_num_subpics_minus1 | ue(v) |
|   pps_subpic_id_len_minus1 | ue(v) |
|   for( i = 0; i <= pps_num_subpic_minus1; i++ ) | |
|     pps_subpic_id[ i ] | u(v) |
| } | |
| no_pic_partition_flag | u(1) |
| if( !no_pic_partition_flag ) { | |
|   pps_log2_ctu_size_minus5 | u(2) |
|   num_exp_tile_columns_minus1 | ue(v) |
|   num_exp_tile_rows_minus1 | ue(v) |
|   for( i = 0; i <= num_exp_tile_columns_minus1; i++ ) | |
|     tile_column_width_minus1[ i ] | ue(v) |
|   for( i = 0; i <= num_exp_tile_rows_minus1; i++ ) | |
|     tile_row_height_minus1[ i ] | ue(v) |

```
        if( NumTilesInPic > 1 )
            rect_slice_flag                                                 u(1)
        if( rect_slice_flag )
            single_slice_per_subpic_flag                                    u(1)
        if( rect_slice_flag && !single_slice_per_subpic_flag ) {
            num_slices_in_pic_minus1                                        ue(v)
            if( num_slices_in_pic_minus1 > 0 )
                tile_idx_delta_present_flag                                 u(1)
            for( i = 0; i < num_slices_in_pic_minus1; i++ ) {
                if( NumTileColumns > 1 )
                    slice_width_in_tiles_minus1[ i ]                        ue(v)
                if( NumTileRows > 1 && ( tile_idx_delta_present_flag ||
                        SliceTopLeftTileIdx[ i ] % NumTileColumns = = 0 ) )
                    slice_height_in_tiles_minus1[ i ]                       ue(v)
                if( slice_width_in_tiles_minus1[ i ] = = 0 &&
                        slice_height_in_tiles_minus1[ i ] = = 0 &&
                        RowHeight[ SliceTopLeftTileIdx[ i ] / NumTileColumns ] > 1
) {
                    num_exp_slices_in_tile[ i ]                             ue(v)
                    for( j = 0; j < num_exp_slices_in_tile[ i ]; j++ )
                        exp_slice_height_in_ctus_minus1[ i ][ j ]           ue(v)
                    i += NumSlicesInTile[ i ] − 1
                }
                if( tile_idx_delta_present_flag && i < num_slices_in_pic_minus1 )
                    tile_idx_delta[ i ]                                     se(v)
            }
        }
        loop_filter_across_tiles_enabled_flag                               u(1)
        loop_filter_across_slices_enabled_flag                              u(1)
    }
    cabac_init_present_flag                                                 u(1)
    for( i = 0; i < 2; i++ )
        num_ref_idx_default_active_minus1[ i ]                              ue(v)
    rpl1_idx_present_flag                                                   u(1)
    init_qp_minus26                                                         se(v)
    cu_qp_delta_enabled_flag                                                u(1)
    pps_chroma_tool_offsets_present_flag                                    u(1)
    if( pps_chroma_tool_offsets_present_flag ) {
        pps_cb_qp_offset                                                    se(v)
        pps_cr_qp_offset                                                    se(v)
        pps_joint_cbcr_qp_offset_present_flag                               u(1)
        if( pps_joint_cbcr_qp_offset_present_flag )
            pps_joint_cbcr_qp_offset_value                                  se(v)
        pps_slice_chroma_qp_offsets_present_flag                            u(1)
        pps_cu_chroma_qp_offset_list_enabled_flag                           u(1)
    }
    if( pps_cu_chroma_qp_offset_list_enabled_flag ) {
        chroma_qp_offset_list_len_minus1                                    ue(v)
        for( i = 0; i <= chroma_qp_offset_list_len_minus1; i++ ) {
            cb_qp_offset_list[ i ]                                          se(v)
            cr_qp_offset_list[ i ]                                          se(v)
            if( pps_joint_cbcr_qp_offset_present_flag )
                joint_cbcr_qp_offset_list[ i ]                              se(v)
        }
    }
    pps_weighted_pred_flag                                                  u(1)
    pps_weighted_bipred_flag                                                u(1)
    deblocking_filter_control_present_flag                                  u(1)
    if( deblocking_filter_control_present_flag ) {
        deblocking_filter_override_enabled_flag                             u(1)
        pps_deblocking_filter_disabled_flag                                 u(1)
        if( !pps_deblocking_filter_disabled_flag ) {
            pps_beta_offset_div2                                            se(v)
            pps_tc_offset_div2                                              se(v)
            pps_cb_beta_offset_div2                                         se(v)
            pps_cb_tc_offset_div2                                           se(v)
            pps_cr_beta_offset_div2                                         se(v)
            pps_cr_tc_offset_div2                                           se(v)
        }
    }
    rpl_info_in_ph_flag                                                     u(1)
    if( deblocking_filter_override_enabled_flag )
        dbf_info_in_ph_flag                                                 u(1)
    sao_info_in_ph_flag                                                     u(1)
    alf_info_in_ph_flag                                                     u(1)
    if( ( pps_weighted_pred_flag || pps_weighted_bipred_flag ) &&
rpl_info_in_ph_flag )
        wp_info_in_ph_flag                                                  u(1)
    qp_delta_info_in_ph_flag                                                u(1)
    pps_ref_wraparound_enabled_flag                                         u(1)
```

-continued

```
if( pps_ref_wraparound_enabled_flag )
    pps_ref_wraparound_offset                                    ue(v)
picture_header_extension_present_flag                            u(1)
slice_header_extension_present_flag                              u(1)
pps_extension_flag                                               u(1)
if( pps_extension_flag )
    while( more_rbsp_data( ) )
        pps_extension_data_flag                                  u(1)
rbsp_trailing_bits( )
}
```

Continuing to refer to FIG. 2, additional fields may be added to a PPS to signal global motion. In case of global motion, presence of global motion parameters in a sequence of pictures may be signaled in a SPS and PPS may reference the SPS by SPS ID. An SPS in some approaches to decoding may be modified to add a field to signal presence of global motion parameters in SPS. For example a one-bit field may be added to an SPS. If global_motion_present bit is 1, global motion related parameters may be expected in a PPS. If global_motion_present bit is 0, no global motion parameter related fields may be present in a PPS. For example, a PPS as illustrated in table 1 may be extended to include a global_motion_present field, for example, as shown in table 2:

```
sequence_parameter_set_rbsp( ) {                           Descript
                                                              or
    sps_sequence_parameter_set_id                             ue(v)
    .
    .
    .
    global_motion_present                                     u(1)
    rbsp_trailing_bits( )
}
```

Similarly, and still referring to FIG. 2, a PPS may include a pps_global_motion_parameters field for a frame, for example as shown in table 3:

```
pic_parameter_set_rbsp( ) {                                Descript
                                                              or
    pps_pic_parameter_set_id                                  ue(v)
    pps_seq_parameter_set_id                                  ue(v)
    .
    .
    .
    pps_global_motion_parameters ( )
    rbsp_trailing_bits( )
}
```

In more detail, and with continued reference to FIG. 2, a PPS may include fields to characterize global motion parameters using control point motion vectors, for example as shown in table 4:

```
pps_global_motion_parameters ( ) {                         Descript
                                                              or
    motion_model_used                                         u(2)
    mv0_x                                                     se(v)
    mv1_y                                                     se(v)
    if(motion_model_used == 1){
        mv1_x                                                 se(v)
        mv1_y                                                 se(v)
    }
    if(motion_model_used == 2){
        mv2_x                                                 se(v)
        mv2_y                                                 se(v)
    }
}
```

As a further non-limiting example, Table 5 below may represent an exemplary SPS:

```
seq_parameter_set_rbsp( ) {                                Descript
                                                              or
    sps_seq_parameter_set_id                                  u(4)
    sps_video_parameter_set_id                                u(4)
    sps_max_sublayers_minus1                                  u(3)
    sps_reserved_zero_4bits                                   u(4)
    sps_ptl_dpb_hrd_params_present_flag                       u(1)
    if( sps_ptl_dpb_hrd_params_present_flag )
        profile_tier_level( 1, sps_max_sublayers_minus1 )
    gdr_enabled_flag                                          u(1)
    chroma_format_idc                                         u(2)
    if( chroma_format_idc = = 3 )
        separate_colour_plane_flag                            u(1)
    res_change_in_clvs_allowed_flag                           u(1)
    pic_width_max_in_luma_samples                             ue(v)
    pic_height_max_in_luma_samples                            ue(v)
    sps_conformance_window_flag                               u(1)
    if( sps_conformance_window_flag ) {
        sps_conf_win_left_offset                              ue(v)
        sps_conf_win_right_offset                             ue(v)
        sps_conf_win_top_offset                               ue(v)
        sps_conf_win_bottom_offset                            ue(v)
    }
```

-continued

| | |
|---|---|
| sps_log2_ctu_size_minus5 | u(2) |
| subpic_info_present_flag | u(1) |
| if( subpic_info_present_flag ) { | |
|   sps_num_subpics_minus1 | ue(v) |
|   sps_independent_subpics_flag | u(1) |
|   for( i = 0; sps_num_subpics_minus1 > 0 && i <= sps_num_subpics_minus1; i++ ) { | |
|     if( i > 0 && pic_width_max_in_luma_samples > CtbSizeY ) | |
|       subpic_ctu_top_left_x[ i ] | u(v) |
|     if( i > 0 && pic_height_max_in_luma_samples > CtbSizeY ) { | |
|       subpic_ctu_top_left_y[ i ] | u(v) |
|     if( i < sps_num_subpics_minus1 && | |
|       pic_width_max_in_luma_samples > CtbSizeY ) | |
|       subpic_width_minus1[ i ] | u(v) |
|     if( i < sps_num_subpics_minus1 && | |
|       pic_height_max_in_luma_samples > CtbSizeY ) | |
|       subpic_height_minus1[ i ] | u(v) |
|     if( !sps_independent_subpics_flag ) { | |
|       subpic_treated_as_pic_flag[ i ] | u(1) |
|       loop_filter_across_subpic_enabled_flag[ i ] | u(1) |
|     } | |
|   } | |
|   sps_subpic_id_len_minus1 | ue(v) |
|   subpic_id_mapping_explicitly_signalled_flag | u(1) |
|   if( subpic_id_mapping_explicitly_signalled_flag ) { | |
|     subpic_id_mapping_in_sps_flag | u(1) |
|     if( subpic_id_mapping_in_sps_flag ) | |
|       for( i = 0; i < = sps_num_subpics_minus1; i++ ) | |
|         sps_subpic_id[ i ] | u(v) |
|   } | |
| } | |
| bit_depth_minus8 | ue(v) |
| sps_entropy_coding_sync_enabled_flag | u(1) |
| if( sps_entropy_coding_sync_enabled_flag ) | |
|   sps_wpp_entry_point_offsets_present_flag | u(1) |
| sps_weighted_pred_flag | u(1) |
| sps_weighted_bipred_flag | u(1) |
| log2_max_pic_order_cnt_lsb_minus4 | u(4) |
| sps_poc_msb_flag | u(1) |
| if( sps_poc_msb_flag ) | |
|   poc_msb_len_minus1 | ue(v) |
| num_extra_ph_bits_bytes | u(2) |
| extra_ph_bits_struct( num_extra_ph_bits_bytes ) | |
| num_extra_sh_bits_bytes | u(2) |
| extra_sh_bits_struct( num_extra_sh_bits_bytes ) | |
| if( sps_max_sublayers_minus1 > 0 ) | |
|   sps_sublayer_dpb_params_flag | u(1) |
| if( sps_pd_dpb_hrd_params_present_flag ) | |
|   dpb_parameters(_sps_max_sublayers_minus1, sps_sublayer_dpb_params_flag ) | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < rpl1_same_as_rpl0_flag ? 1 : 2; i++ ) { | |
|   num_ref_pic_lists_in_sps[ i ] | ue(v) |
|   for( j = 0; j < num_ref_pic_lists_in_sps[ i ]; j++ ) | |
|     ref_pic_list_struct( i, j ) | |
| } | |
| if( ChromaArrayType != 0 ) | |
|   qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |

-continued

```
      if( sps_max_mtt_hierarchy_depth_intra_slice_chroma != 0 ) {
        sps_log2_diff_max_bt_min_qt_intra_slice_chroma        ue(v)
        sps_log2_diff_max_tt_min_qt_intra_slice_chroma        ue(v)
      }
    }
    sps_max_luma_transform_size_64_flag                       u(1)
    if( ChromaArrayType != 0 ) {
      sps_joint_cbcr_enabled_flag                             u(1)
      same_qp_table_for_chroma                                u(1)
      numQpTables = same_qp_table_for_chroma ? 1 : (
sps_joint_cbcr_enabled_flag ? 3 : 2 )
      for( i = 0; i < numQpTables; i++ ) {
        qp_table_start_minus26[ i ]                           se(v)
        num_points_in_qp_table_minus1[ i ]                    ue(v)
        for( j = 0; j < = num_points_in_qp_table_minus1 [ i ]; j++ ) {
          delta_qp_in_val_minus1[ i ][ j ]                    ue(v)
          delta_qp_diff_val[ i ][ j ]                         ue(v)
        }
      }
    }
    sps_sao_enabled_flag                                      u(1)
    sps_alf_enabled_flag                                      u(1)
    if( sps_alf_enabled_flag && ChromaArrayType != 0 )
      sps_ccalf_enabled_flag                                  u(1)
    sps_transform_skip_enabled_flag                           u(1)
    if( sps_transform_skip_enabled_flag ) {
      log2_transform_skip_max_size_minus2                     ue(v)
      sps_bdpcm_enabled_flag                                  u(1)
    }
    sps_ref_wraparound_enabled_flag                           u(1)
    sps_temporal_mvp_enabled_flag                             u(1)
    if( sps_temporal_mvp_enabled_flag )
      sps_sbtmvp_enabled_flag                                 u(1)
    sps_amvr_enabled_flag                                     u(1)
    sps_bdof_enabled_flag                                     u(1)
    if( sps_bdof_enabled_flag )
      sps_bdof_pic_present_flag                               u(1)
    sps_smvd_enabled_flag                                     u(1)
    sps_dmvr_enabled_flag                                     u(1)
    if( sps_dmvr_enabled_flag )
      sps_dmvr_pic_present_flag                               u(1)
    sps_mmvd_enabled_flag                                     u(1)
    sps_isp_enabled_flag                                      u(1)
    sps_mrl_enabled_flag                                      u(1)
    sps_mip_enabled_flag                                      u(1)
    if( ChromaArrayType != 0 )
      sps_cclm_enabled_flag                                   u(1)
    if( chroma_format_idc = = 1 ) {
      sps_chroma_horizontal_collocated_flag                   u(1)
      sps_chroma_vertical_collocated_flag                     u(1)
    }
    sps_mts_enabled_flag                                      u(1)
    if( sps_mts_enabled_flag ) {
      sps_explicit_mts_intra_enabled_flag                     u(1)
      sps_explicit_mts_inter_enabled_flag                     u(1)
    }
    six_minus_max_num_merge_cand                              ue(v)
    sps_sbt_enabled_flag                                      u(1)
    sps_affine_enabled_flag                                   u(1)
    if( sps_affine_enabled_flag ) {
      five_minus_max_num_subblock_merge_cand                  ue(v)
      sps_affine_type_flag                                    u(1)
      if( sps_amvr_enabled_flag )
        sps_affine_amvr_enabled_flag                          u(1)
      sps_affine_prof_enabled_flag                            u(1)
      if( sps_affine_prof_enabled_flag )
        sps_prof_pic_present_flag                             u(1)
    }
    sps_palette_enabled_flag                                  u(1)
    if( ChromaArrayType = = 3 && !sps_max_luma_transform_size_64_flag )
      sps_act_enabled_flag                                    u(1)
    if( sps_transform_skip_enabled_flag | | sps_palette_enabled_flag )
      min_qp_prime_ts_minus4                                  ue(v)
    sps_bcw_enabled_flag                                      u(1)
    sps_ibc_enabled_flag                                      u(1)
    if( sps_ibc_enabled_flag )
      six_minus_max_num_ibc_merge_cand                        ue(v)
    sps_ciip_enabled_flag                                     u(1)
```

-continued

```
if( sps_mmvd_enabled_flag )
    sps_fpel_mmvd_enabled_flag                              u(1)
if( MaxNumMergeCand >= 2 ) {
    sps_gpm_enabled_flag                                    u(1)
    if( sps_gpm_enabled_flag && _maxNumMergeCand >= 3 )
        max_num_merge_cand_minus_max_num_gpm_cand           ue(v)
}
sps_lmcs_enabled_flag                                       u(1)
sps_lfnst_enabled_flag                                      u(1)
sps_ladf_enabled_flag                                       u(1)
if( sps_ladf_enabled_flag ) {
    sps_num_ladf_intervals_minus2                           u(2)
    sps_ladf_lowest_interval_qp_offset                      se(v)
    for( i = 0; i < sps_num_ladf_intervals_minus2 + 1; i++ ) {
        sps_ladf_qp_offset[ i ]                             se(v)
        sps_ladf_delta_threshold_minus1[ i ]                ue(v)
    }
}
log2_parallel_merge_level_minus2                            ue(v)
sps_explicit_scaling_list_enabled_flag                      u(1)
sps_dep_quant_enabled_flag                                  u(1)
if( !sps_dep_quant_enabled_flag )
    sps_sign_data_hiding_enabled_flag                       u(1)
sps_virtual_boundaries_enabled_flag                         u(1)
if( sps_virtual_boundaries_enabled_flag ) {
    sps_virtual_boundaries_present_flag                     u(1)
    if( sps_virtual_boundaries_present_flag ) {
        sps_num_ver_virtual_boundaries                      u(2)
        for( i = 0; i < sps_num_ver_virtual_boundaries; i++ )
            sps_virtual_boundaries_pos_x[ i ]               u(13)
        sps_num_hor_virtual_boundaries                      u(2)
        for( i = 0; i < sps_num_hor_virtual_boundaries; i++ )
            sps_virtual_boundaries_pos_y[ i ]               u(13)
    }
}
if( sps_ptl_dpb_hrd_params_present_flag ) {
    sps_general_hrd_params_present_flag                     u(1)
    if( sps_general_hrd_params_present_flag ) {
        general_hrd_parameters( )
        if( sps_max_sublayers_minus1 > 0 )
            sps_sublayer_cpb_params_present_flag            u(1)
        firstSubLayer = sps_sublayer_cpb_params_present_flag ? 0 :
            sps_max_sublayers_minus1
        ols_hrd_parameters( firstSubLayer, sps_max_sublayers_minus1 )
    }
}
field_seq_flag                                              u(1)
vui_parameters_present_flag                                 u(1)
if( vui_parameters_present_flag )
    vui_parameters( ) /* Specified in ITU-T H.SEI | ISO/IEC 23002-7 */
sps_extension_flag                                          u(1)
if( sps_extension_flag )
    while( more_rbsp_data( ) )
        sps_extension_data_flag                             u(1)
rbsp_trailing_bits( )
}
```

An SPS table as above may be expanded as described above to incorporate a global motion present indicator as shown in Table 6:

| sequence_parameter_set_rbsp( ) { | Descriptor |
|---|---|
| sps_sequence_parameter_set_id | ue(v) |
| . | |
| . | |
| . | |
| global_motion_present | u(1) |
| rbsp_trailing_bits( ) | |
| } | |

Additional fields may be incorporated in an SPS to reflect further indicators as described in this disclosure.

In an embodiment, and still referring to FIG. 2, an sps_affine_enabled_flag may specify whether affine model based motion compensation may be used for inter prediction. If sps_affine_enabled_flag is equal to 0, the syntax may be constrained such that no affine model based motion compensation is used in the code later video sequence (CLVS), and inter_affine_flag and cu_affine_type_flag may not be present in coding unit syntax of the CLVS. Otherwise (sps_affine_enabled_flag is equal to 1), affine model based motion compensation can be used in the CLVS.

Continuing to refer to FIG. 2, sps_affine_type_flag may specify whether 6-parameter affine model based motion compensation may be used for inter prediction. If sps_affine_type_flag is equal to 0, syntax may be constrained such that no 6-parameter affine model based motion compensation is used in the CLVS, and cu_affine_type_flag may not present in coding unit syntax in the CLVS. Otherwise (sps_affine_type_flag equal to 1), 6-parameter affine model based motion compensation may be used in CLVS. When not present, the value of sps_affine_type_flag may be inferred to be equal to 0.

Still referring to FIG. 2, translational CPMVs may be signaled in a PPS. Control points may be predefined. For example, control point MV 0 may be relative to a top left corner of a picture, MV 1 may be relative to a top right corner, and MV 3 may be relative to a bottom left corner of a picture. Table 4 illustrates an example approach for signaling CPMV data depending on the motion model used.

In an exemplary embodiment, and still referring to FIG. 2, an array amvr_precision_idx, which may be signaled in coding unit, coding tree, or the like, may specify a resolution AmvrShift of a motion vector difference, which may be defined as a non-limiting example as shown in Table 7 as shown below. Array indices x0, y0 may specify the location (x0, y0) of a top-left luma sample of a considered coding block relative to a top-left luma sample of the picture; when amvr_precision_idx[x0][y0] is not present, it may be inferred to be equal to 0. Where an inter_affine_flag[x0][y0] is equal to 0, variables MvdL0[x0][y0][0], MvdL0[x0][y0][1], MvdL1[x0][y0][0], MvdL1[x0][y0][1] representing modsion vector difference values corresponding to consered block, may be modified by shifting such values by AmvrShift, for instance using MvdL0[x0][y0][0]=MvdL0[x0][y0][0]<<AmvrShift; MvdL0[x0][y0][1]=MvdL0[x0][y0][1]<<AmvrShift; MvdL1[x0][y0][0]=MvdL1[x0][y0][0]<<AmvrShift; and MvdL1[x0][y0][1]=MvdL1[x0][y0][1]<<AmvrShift. Where inter_affine_flag[x0][y0] is equal to 1, variables MvdCpL0[x0][y0][0][0], MvdCpL0[x0][y0][0][1], MvdCpL0[x0][y0][1][0], MvdCpL0[x0][y0][1][1], MvdCpL0[x0][y0][2][0] and MvdCpL0[x0][y0][2][1] may be modified via shifting, for instance as follows: MvdCpL0[x0][y0][0][0]=MvdCpL0[x0][y0][0][0]<<AmvrShift; MvdCpL1[x0][y0][0][1]=MvdCpL1[x0][y0][0][1]<<AmvrShift; MvdCpL0[x0][y0][1][0]=MvdCpL0[x0][y0][1][0]<<AmvrShift; MvdCpL1[x0][y0][1][1]=MvdCpL1[x0][y0][1][1]<<AmvrShift; MvdCpL0[x0][y0][2][0]=MvdCpL0[x0][y0][2][0]<<AmvrShift; and MvdCpL1[x0][y0][2][1]=MvdCpL1[x0][y0][2][1]<<AmvrShift associated signaling information from bit stream. In some implementations, a current block may include a coding tree unit (CTU), a coding unit (CU), or a prediction unit (PU). At step 310, a header may be extracted from bitstream. At step 315, a global motion model may be determined using the header; determination of global motion model may be performed as above, including by determination as signaled in a PPS and/or SPS. At step 320, a current block of a current frame may be decoded using a determined global motion model.

Figure 4:
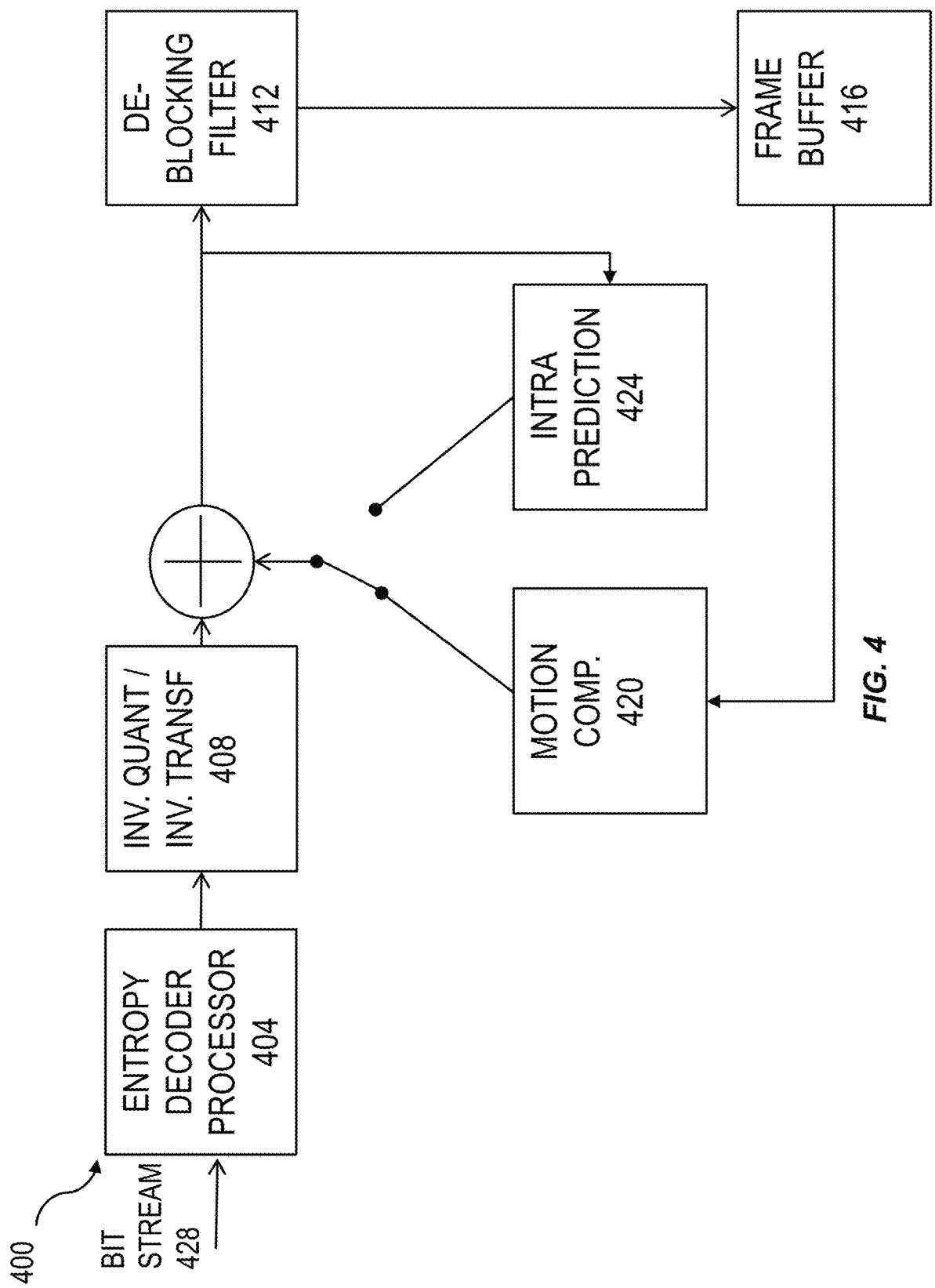
FIG. 4 is a system block diagram of an example decoder according to some example implementations of the current subject matter.

FIG. 4 is a system block diagram illustrating an example decoder 400 capable of decoding a bitstream 428 with signaling global motion model that can improve compression efficiency. Decoder 400 may include an entropy decoder processor 404, an inverse quantization and inverse transformation processor 408, a deblocking filter 412, a frame buffer 416, motion compensation processor 420 and intra prediction processor 424.

In operation, and still referring to FIG. 4, a bit stream 428 may be received by decoder 400 and input to entropy decoder processor 404, which entropy decodes portions of the bit stream into quantized coefficients. Quantized coefficients may be provided to inverse quantization and inverse transformation processor 408, which may perform inverse quantization and inverse transformation to create a residual signal, which may be added to an output of motion compensation processor 420 or intra prediction processor 424 according to a processing mode. An output of motion compensation processor 420 and intra prediction processor 424 may include a block prediction based on a previously decoded block. A sum of prediction and residual may be processed by a deblocking filter 630 and stored in a frame buffer 640.

Figure 5:
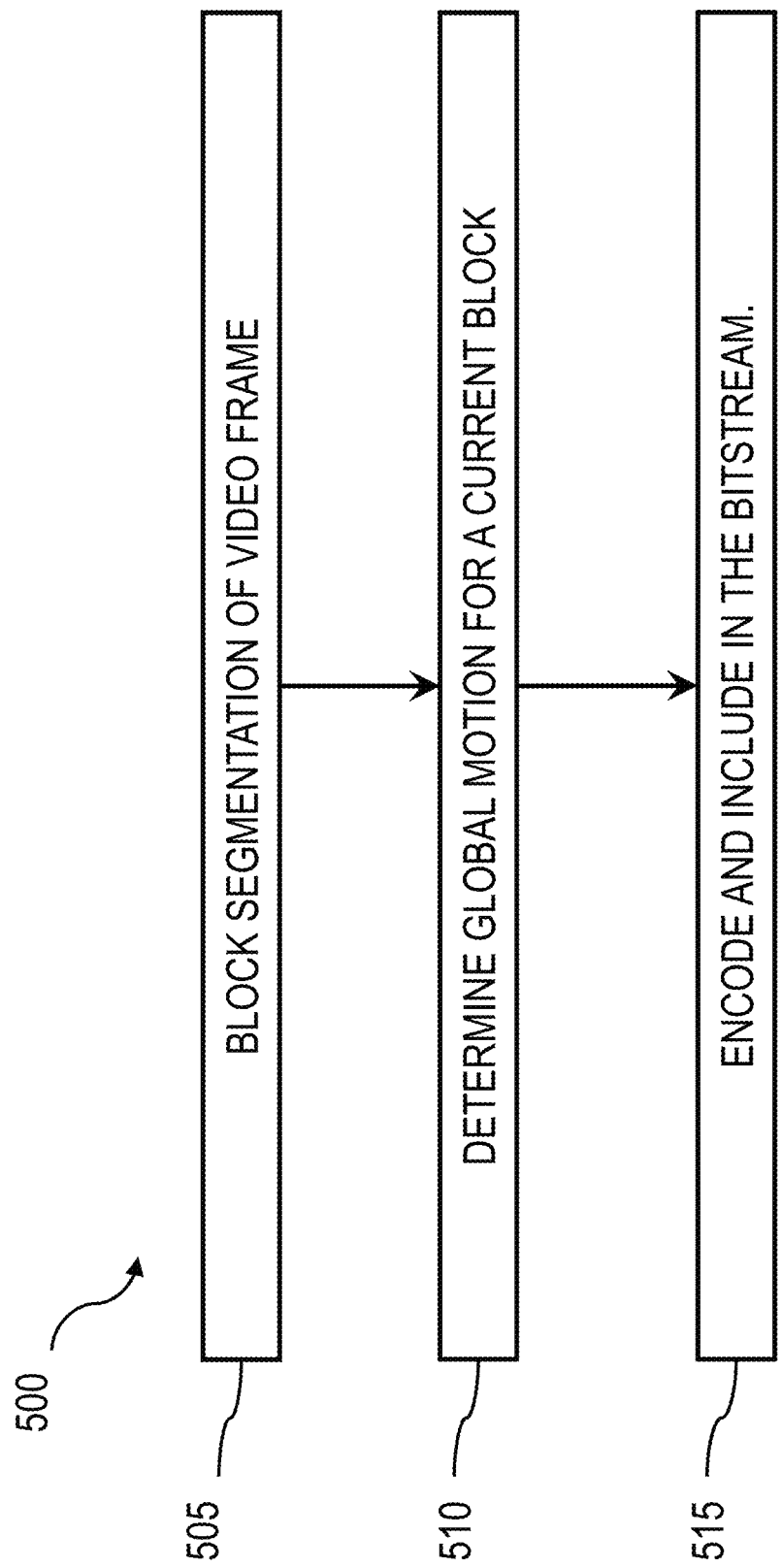
FIG. 5 is a process flow diagram according to some example implementations of the current subject matter.

FIG. 5 is a process flow diagram illustrating an example process 500 of encoding a video with signaling global motion that can improve compression efficiency according to some aspects of the current subject matter. At step 505, a video frame may undergo initial block segmentation, for example, using a tree-structured macro block partitioning scheme that may include partitioning a picture frame into

| amvr_flag | amvr_precision_id | AmvrShift | | |
|---|---|---|---|---|
| | | inter_affine_flag == 1 | CuPredMode[ chType ][ x0 ][ y0 ] == MODE_IBC ) | inter_affine_flag == 0 && CuPredMode[ chType ][ x0 ][ y0 ] != MODE_IBC |
| 0 | — | 2 (1/4 luma sample) | — | 2 (1/4 luma sample) |
| 1 | 0 | 0 (1/16 luma sample) | 4 (1 luma sample) | 3 (1/2 luma sample) |
| 1 | 1 | 4 (1 luma sample) | 6 (4 luma samples) | 4 (1 luma sample) |
| 1 | 2 | — | — | 6 (4 luma samples) |

With continued reference to FIG. 2, global motion may be relative to a previously coded frame. When only one set of global motion parameters are present, motion may be relative to a frame that is presented immediately before a current frame.

Figure 3:
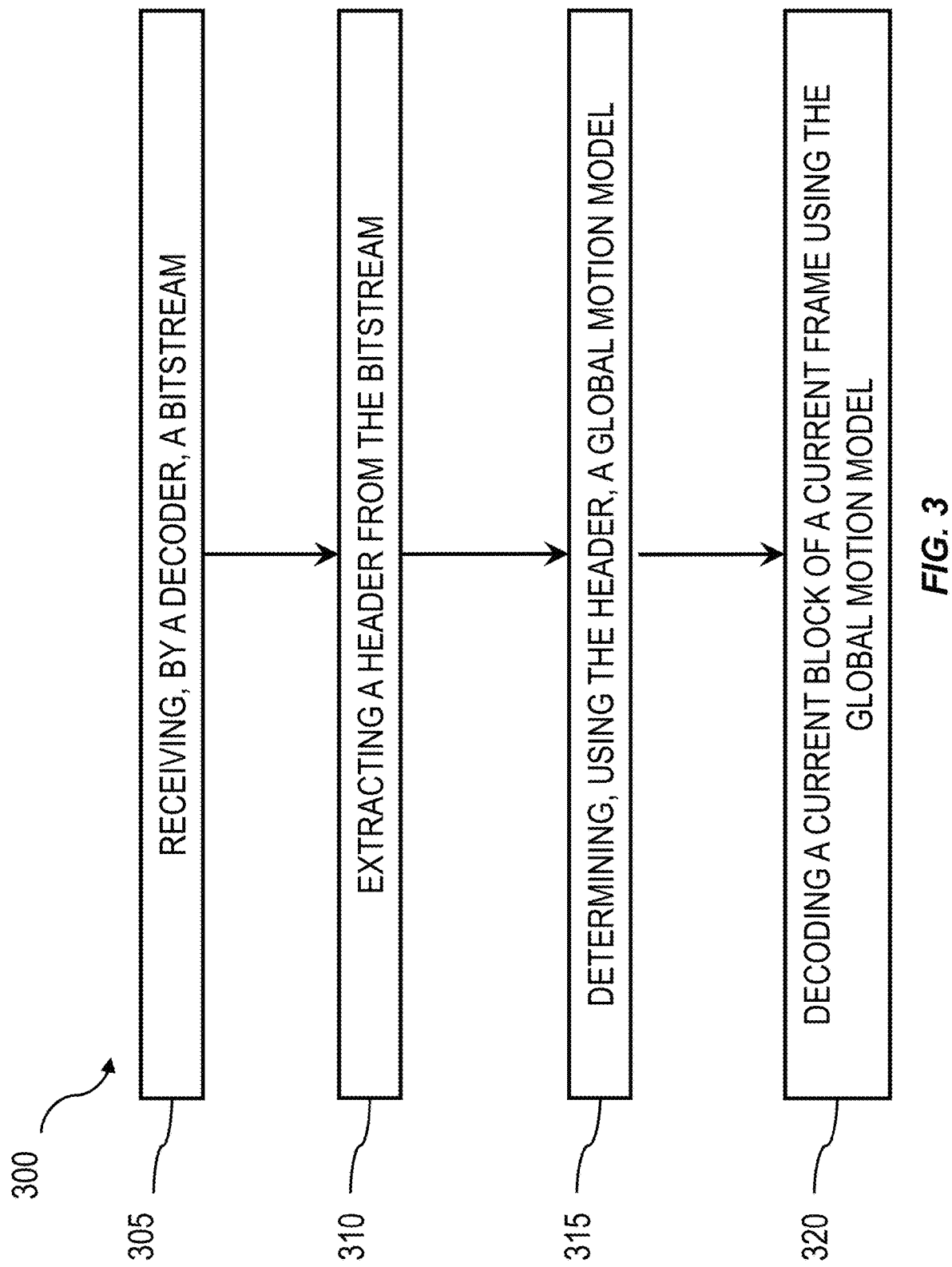
FIG. 3 is a process flow diagram according to some example implementations of the current subject matter.

FIG. 3 is a process flow diagram illustrating an example process 300 of signaling global motion model for decoding that can improve compression efficiency.

At step 305, and still referring to FIG. 3, a bitstream is received by a decoder. A current block may be contained within a bitstream that decoder receives. Bitstream may include, for example, data found in a stream of bits that is an input to a decoder when using data compression. Bitstream may include information necessary to decode a video. Receiving may include extracting and/or parsing a block and CTUs and CUs. At step 510, global motion for a current block may be determined. Determining global motion may include determining a global motion model and associated parameters. At step 515, global motion model, associated parameters, and block may be encoded and included in a bitstream. Encoding may include utilizing inter prediction and intra prediction modes, for example.

Figure 6:
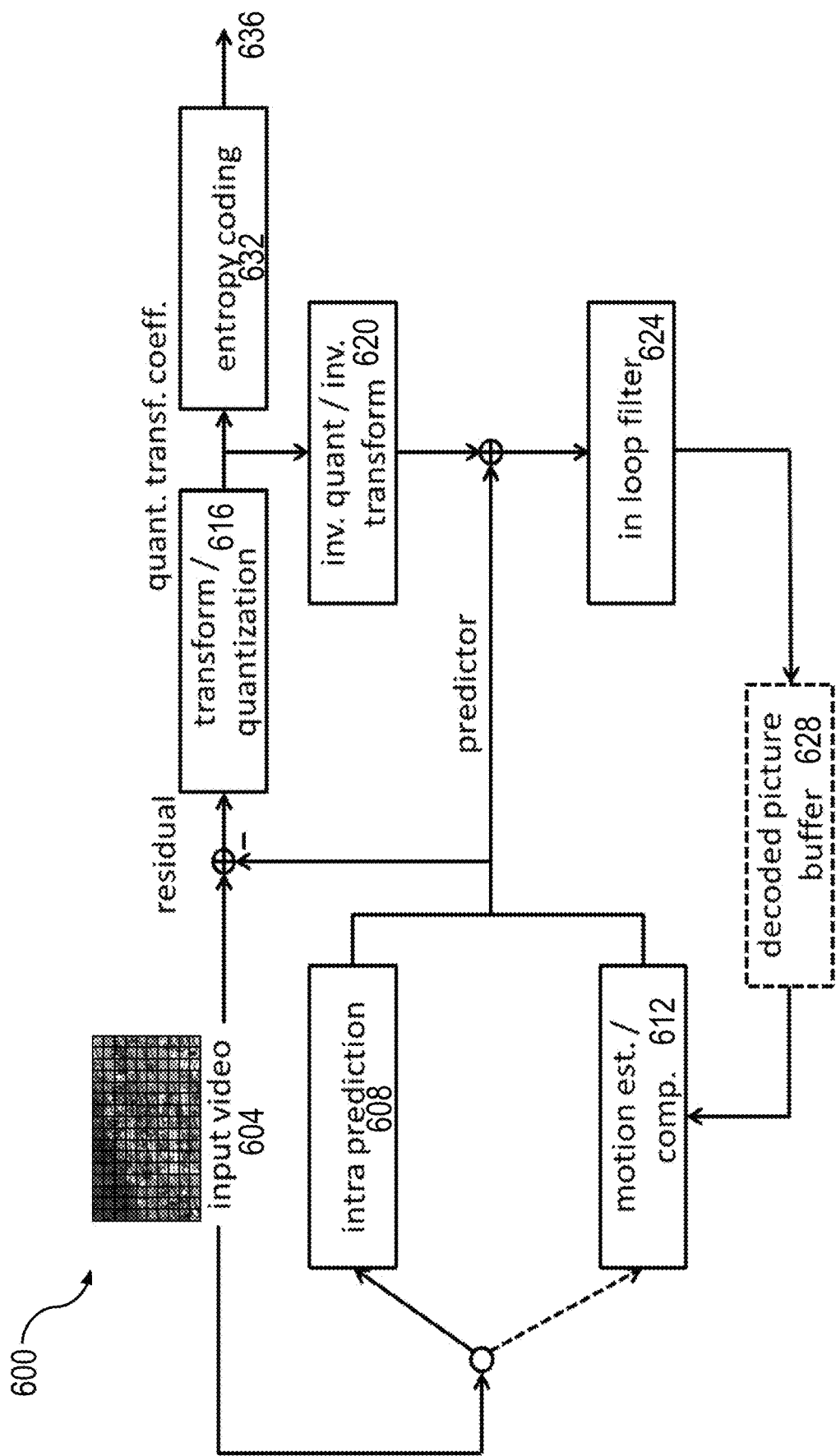
FIG. 6 is a system block diagram of an example encoder according to some example implementations of the current subject matter.

FIG. 6 is a system block diagram illustrating an example video encoder 600 capable of signaling global motion that can improve compression efficiency. Example video encoder 600 may receive an input video 604, which may be initially segmented or dividing according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding units (CU). A final result of this portioning may include a group of sub-blocks that may be called predictive units (PU). Transform units (TU) may also be utilized.

Still referring to FIG. 6, example video encoder 600 may include an intra prediction processor 608, a motion estimation/compensation processor 612 (also referred to as an inter prediction processor) capable of supporting global motion signaling and processing, a transform/quantization processor 616, an inverse quantization/inverse transform processor 620, an in-loop filter 624, a decoded picture buffer 628, and/or an entropy coding processor 632. Bit stream parameters may be input to entropy coding processor 632 for inclusion in output bit stream 636.

In operation, and further referring to FIG. 6, for each block of a frame of input video 604, whether to process the block via intra picture prediction or using motion estimation/compensation may be determined. Block may be provided to intra prediction processor 608 or motion estimation/compensation processor 612. If block is to be processed via intra prediction, intra prediction processor 608 may perform processing to output predictor. If block is to be processed via motion estimation/compensation, motion estimation/compensation processor 612 may perform processing including global motion signaling, if applicable.

Still referring to FIG. 6, a residual may be formed by subtracting predictor from input video. Residual may be received by transform/quantization processor 616, which may perform transformation processing (e.g., discrete cosine transform (DCT)) to produce coefficients, which may be quantized. Quantized coefficients and any associated signaling information may be provided to entropy coding processor 632 for entropy encoding and inclusion in output bit stream 636. Entropy encoding processor 632 may support encoding of signaling information related to encoding current block. In addition, quantized coefficients may be provided to inverse quantization/inverse transformation processor 620, which mat reproduce pixels, which mat be combined with predictor and processed by in loop filter 624, an output of which may be stored in decoded picture buffer 628 for use by motion estimation/compensation processor 612 that is capable of global motion signaling and processing.

Although a few variations have been described in detail above, other modifications or additions are possible. For example, in some implementations, current blocks can include any symmetric blocks (8×8, 16×16, 32×32, 64×64, 128×128, and the like) as well as any asymmetric block (8×4, 16×8, and the like).

In some implementations, a quadtree plus binary decision tree (QTBT) may be implemented. In QTBT, at the Coding Tree Unit level, partition parameters of QTBT are dynamically derived to adapt to local characteristics without transmitting any overhead. Subsequently, at a Coding Unit level, a joint-classifier decision tree structure may eliminate unnecessary iterations and control risk of false prediction. In some implementations, LTR frame block update mode may be available as an additional option available at every leaf node of QTBT.

In some implementations, additional syntax elements may be signaled at different hierarchy levels of a bitstream. For example, a flag may be enabled for an entire sequence by including an enable flag coded in a Sequence Parameter Set (SPS). Further, a CTU flag may be coded at the coding tree unit (CTU) level.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which may be special or general purpose, coupled to receive data and instructions from, and to transmit data and instructions to, a storage system, at least one input device, and at least one output device. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
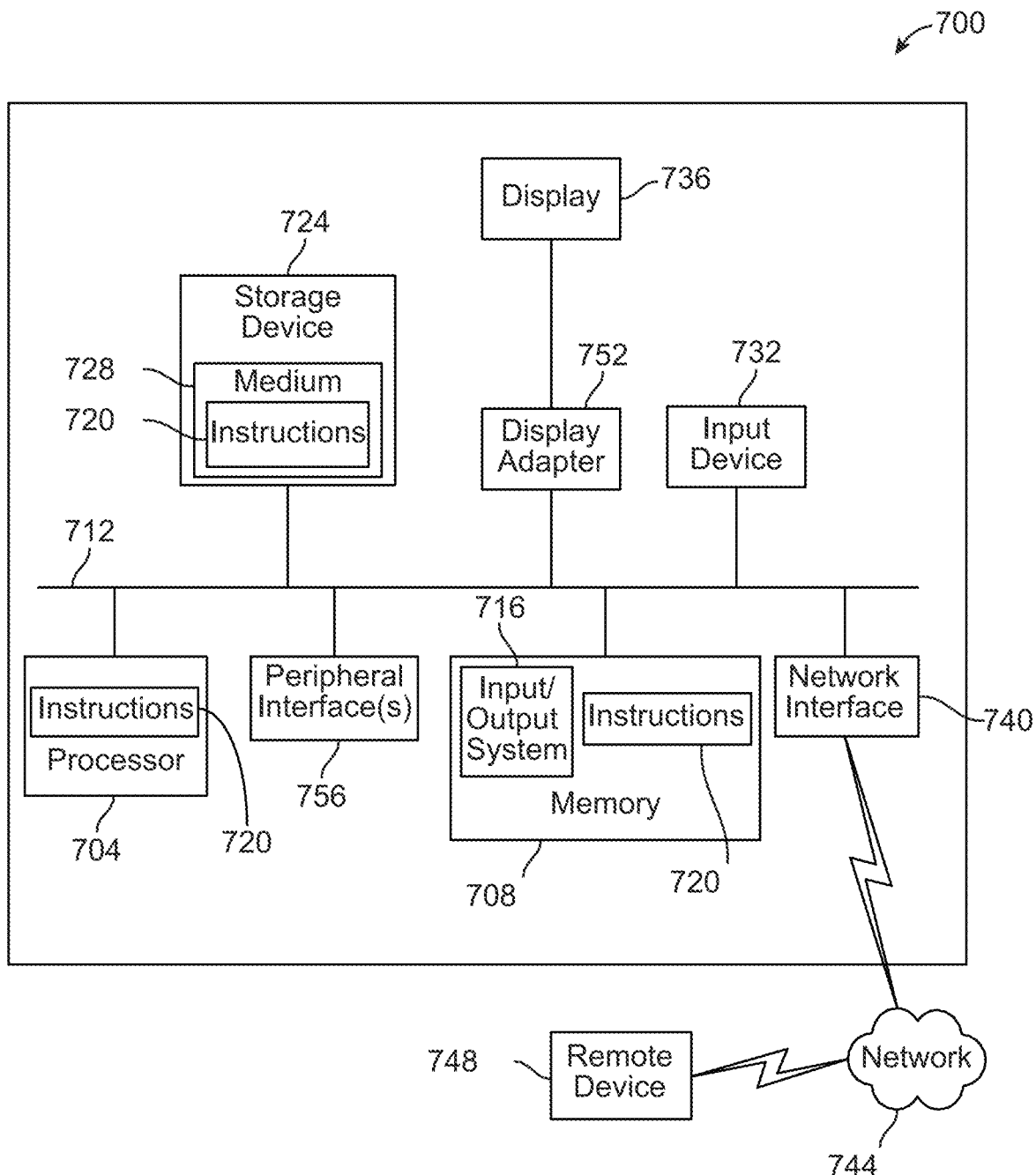
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein. Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A decoder, the decoder comprising circuitry configured to:
    receive a bitstream including a coded picture, the coded picture including a first region comprising a first contiguous plurality of coding blocks having global motion and a second region comprising a second contiguous plurality of coding blocks having local motion;
    for each block in the first region,
        determine a motion model, the motion model being global for all of the blocks in the first region and being one of translational motion, 4-parameter affine motion, or 6-parameter affine motion, the parameters of the motion model for each block in the first region being determined from at least one motion vector signaled in the bitstream; and
        decode each block in the first region using the parameters of the motion model to reconstruct the global motion in the first region; and
    for each block in the second region, decode each block using motion information determined individually for each block to reconstruct the local motion in the second region.

2. The decoder of claim 1 further comprising:
    an entropy decoder processor configured to receive the bit stream and decode the bitstream into quantized coefficients;
    an inverse quantization and inverse transformation processor configured to process the quantized coefficients including performing an inverse discrete cosine;
    a deblocking filter;
    a frame buffer; and
    an intra prediction processor.

3. The decoder of claim 1, wherein the current block forms part of a quadtree plus binary decision tree.

4. The decoder of claim 1, wherein the current block is a coding tree unit.

5. The decoder of claim 1, wherein the current block is a coding unit.

6. An encoder configured to encode a bitstream for decoding by a compatible decoder, the decoder being configured to:
    receive the encoded bitstream, the bitstream including a coded picture, the coded picture including a first region comprising a first contiguous plurality of coding blocks having global motion and a second region comprising a second contiguous plurality of coding blocks having local motion;
    for each block in the first region;
        determine a motion model, the motion model being global for all of the blocks in the first region and being one of translational motion, 4-parameter affine motion, or 6-parameter affine motion, the parameters for the motion model for each block in the first region being determined from at least one motion vector signaled in the bitstream; and
        decode each block in the first region using the parameters of the motion model to reconstruct the global motion in the first region; and
    for each block in the second region decode each block using motion information determined individually for each block to reconstruct the local motion in the second region.

7. The encoder of claim 6, wherein the motion model is an affine motion model and the motion vectors are control point motion vectors.

8. The encoder of claim 7, wherein the affine motion model is 4-parameter affine motion model having two control point motion vectors.

9. The encoder of claim 7, wherein the affine motion model is 6-parameter affine motion model having three control point motion vectors.

10. The decoder of claim 1, wherein the motion model is an affine motion model and the motion vectors are control point motion vectors.

11. The decoder of claim 10, wherein the affine motion model is 4-parameter affine motion model having two control point motion vectors.

12. The decoder of claim 10, wherein the affine motion model is 6-parameter affine motion model having three control point motion vectors.

* * * * *